United States Patent
Hudin et al.

(10) Patent No.: US 10,585,520 B2
(45) Date of Patent: Mar. 10, 2020

(54) SYSTEM AND METHOD FOR DETECTING AN APPLICATION OF PRESSURE AT THE SURFACE OF AN OBJECT BY FORCE MEASUREMENT

(71) Applicant: Commissariat à l'Énergie Atomique et aux Énergies Alternatives, Paris (FR)

(72) Inventors: Charles Hudin, Paris (FR); Steven Strachan, Paris (FR)

(73) Assignee: COMMISSARIAT Á L'ÈNERGIE ATOMIQUE ET AUX ÈNERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/770,879

(22) PCT Filed: Oct. 31, 2016

(86) PCT No.: PCT/EP2016/076191
§ 371 (c)(1),
(2) Date: Apr. 25, 2018

(87) PCT Pub. No.: WO2017/076789
PCT Pub. Date: May 11, 2017

(65) Prior Publication Data
US 2018/0314375 A1 Nov. 1, 2018

(30) Foreign Application Priority Data
Nov. 4, 2015 (FR) ..................... 15 60574

(51) Int. Cl.
*G06F 3/041* (2006.01)
*G01B 7/004* (2006.01)
*G01L 5/22* (2006.01)

(52) U.S. Cl.
CPC .......... *G06F 3/0414* (2013.01); *G01B 7/004* (2013.01); *G06F 3/0416* (2013.01); *G01L 5/22* (2013.01)

(58) Field of Classification Search
CPC ...... G06F 3/0414; G06F 3/0416; G06F 3/016; G06F 3/041; G06F 3/043; G06F 3/044;
(Continued)

(56) References Cited

U.S. PATENT DOCUMENTS

| 3,657,475 A | 4/1972 | Peronneau et al. |
| 8,436,825 B2 * | 5/2013 | Coni ................ G06F 3/041 178/18.01 |

(Continued)

OTHER PUBLICATIONS

International Search Report for International Application No. PCT/EP2016/076191, dated Jan. 20, 2017.
(Continued)

*Primary Examiner* — Vijay Shankar
(74) *Attorney, Agent, or Firm* — Pearne & Gordon LLP

(57) ABSTRACT

A system for detecting an application of pressure on a surface of an object, comprising a support of the object equipped with at least one sensor of force and of torque, and a processing unit configured to calculate, on the basis of the measurements of the at least one force and torque sensor, the coordinates of a straight line in space passing through a point of application of pressure on the surface of the object. The processing unit determines, by use of a ray-tracing calculation, whether an elementary facet of a geometric model of the surface of the object representing the surface according to a mesh of elementary facets intercepts the straight line passing through the point of application of pressure.

9 Claims, 2 Drawing Sheets

(58) Field of Classification Search
CPC ......... G06F 2203/013; G06F 2203/014; G06F 2203/015
See application file for complete search history.

(56) References Cited

U.S. PATENT DOCUMENTS

| | | | | |
|---|---|---|---|---|
| 8,803,822 | B2* | 8/2014 | Bai | G06F 3/043 |
| | | | | 345/173 |
| 9,298,259 | B2* | 3/2016 | Wiertlewski | G06F 3/015 |
| 9,436,284 | B2 | 9/2016 | Hudin et al. | |
| 9,690,380 | B2* | 6/2017 | Monkhouse | G06F 3/016 |
| 10,007,341 | B2* | 6/2018 | Colgate | G06F 3/016 |
| 10,063,163 | B2* | 8/2018 | Leroy | H01L 41/0906 |
| 2009/0256807 | A1 | 10/2009 | Nurmi | |
| 2015/0220197 | A1 | 8/2015 | Algreatly | |

OTHER PUBLICATIONS

Preliminary French Search Report for Application No. FR 1560574, dated Sep. 6, 2016.

Bicchi et al., "Contact Sensing from Force Measurements," International Journal of Robotics Research, Sage Science Press, Thousand Oaks, US, vol. 12, No. 3: Jun. 1, 1993; pp. 249-262.

Leng Yuquan et al., "Collision position sensing for manipulator using force/torque sensor," 2015 Proceedings of the 34th Chinese Control Conference (CCC), Jan. 1, 2015; pp. 5809-5814.

Tomas Moller et al., "Fast, Minimum Storage Ray-Triangle Intersection," Journal of Graphic Tools, vol. 2, No. 1, Jan. 1, 1997; pp. 21-28.

Written Opinion for International Application No. PCT/EP2016/076191, dated Jan. 20, 2017.

Steffen Haidacher, "Contact Point and Object Position form Force/Torque and Position Sensors for Grasps with a Dextrous Robotic Hand": Jan. 21, 2004.

* cited by examiner

SYSTEM AND METHOD FOR DETECTING AN APPLICATION OF PRESSURE AT THE SURFACE OF AN OBJECT BY FORCE MEASUREMENT

This is a National Stage application of PCT international application PCT/EP2016/076191, filed on Oct. 31, 2016 which claims the priority of French Patent Application No. 1560547, filed Nov. 4, 2015, both of which are incorporated herein by reference in their entirety.

TECHNICAL FIELD

The field of the invention is that of detecting an application of pressure at the surface of an object. The invention relates more particularly to a detection based on the use of a force and torque sensor which makes it possible to quantify the action/reaction forces of two bodies in contact, namely the object on the surface of which a pressure is locally exerted and a support of the object.

PRIOR ART

In order to determine the position of a contact exerted by a user on the surface of an object, the surface of the object is generally instrumented in order to render it tactile, i.e. sensitive to the touch.

A solution in these terms consists in providing the surface of the object with a network of electrodes. The contact with an electrode provokes a variation in the capacity that can be measured. Only a finite number of contact points, determined by the number of electrodes, can therefore be detected and each tactile zone must be covered with an electrode. In addition to modifying the exterior aspect of the object, it is difficult with this solution to render the entire surface of an object tactile. Finally this solution does not make it possible to know the support force exerted.

The solutions that require the least intervention on the object to be rendered tactile are the optical methods. The methods of segmenting video images, taken with a structured light or not, make it possible for example to distinguish the object from the finger or fingers in contact and as such to locate them. These solutions are however sensitive to the lighting conditions and suffer from occlusion problems when the hand is masked by the object or leaves the field of the camera. And this solution also does not make it possible to know the support force exerted.

Another solution is based on the fact that the mechanical balance of an object imposes that the forces exerted by a user on the surface of the object are offset by the forces exerted by the support on this object, in such a way that the sum of the forces (support+action of the user) is zero at each instant. By making use of this principle, the position of the contact and the force exerted by a user on the object can be determined using the forces and momentums measured on the support.

The forces measured by three force sensors (or more) supporting a screen as such make it possible to position a contact point on a flat surface, such as for example described in U.S. Pat. No. 3,657,475.

This solution has been extended to robotics in the case of a non-flat surface in order to give a tactile perception to robots and increase their ability to manipulate objects. The force sensor in this framework measures the forces and momentums transmitted by the robot end-effector to the rest of the body of the robot.

This solution is in particular described in the article by Bicchi, J. K. Salisbury, and D. L. Brock, entitled "*Contact Sensing from Force Measurements*", The International Journal of Robotics Research, vol. 12, no. 3, pp. 249-262, June 1993.

This article poses the mathematical developments that make it possible to obtain the position of the contact point on the surface using a measurement of three force components and three momentum components. The measurement alone of these forces and momentums does not make it possible to locate the contact point, but reduces all of the possible positions to an axis of the space, called the skew axis. As the contact takes place on the surface of the object, the point sought is therefore at the intersection of the skew axis with the surface. This solution therefore requires, in addition to having force sensors, knowing the geometry of the surface to render tactile in order to determine this intersection.

Solutions are given for simple geometric objects (spheres, cylinders for example) that can be described in mathematical form to make it possible to analytically calculate the intersection of the skew axis with the surface of the object. This article mentions the possibility of decomposing an object into a set of simple elementary objects that can each be described mathematically in order to allow for the analytical calculation of the intersection. Such a mathematical description is however not always possible for objects of complex shape, in such a way that the method proposed in this article cannot be applied to an object of any shape whatsoever.

DISCLOSURE OF THE INVENTION

The invention has for objective to render tactile the surface of an object by determining the position and the force of a contact exerted by a user on this surface, this without having to instrument the surface of the object and this regardless of the material or the shape of the object.

To this effect, the invention propose a system for detecting an application of pressure on a surface of an object, comprising a support of the object provided with at least one force and torque sensor, and a processing unit comprising a module for characterising the application of pressure configured to calculate, using measurements of the at least one force and torque sensor, the coordinates of an axis of the space passing through a point of application of pressure on the surface of the object. The module for characterising the application of pressure is furthermore configured to determine, by means of a ray tracing calculation, if an elementary facet of a geometric model of the surface of the object representing said surface according to a meshing of elementary facets intercepts the axis passing through the point of application of pressure.

Certain preferred but not limiting aspects of this system are as follows:
- the module for characterising the application of pressure is also configured, on determination that the elementary facet intercepts the axis passing through the point of application of pressure, to associate the elementary facet with a location of the point of application of pressure;
- the module for characterising the application of pressure is also configured to determine the normal and tangential components of the application of pressure for the elementary facet associated with a location of the point of application of pressure;
- the module for characterising the application of pressure is configured to calculate the scalar product between the force measured by the force and torque sensor and the normal to the elementary facet, with the ray tracing calculation being performed to verify if the elementary facet intercepts the axis passing through the point of application of pressure only if the scalar product calculated is negative;

the module for characterising the application of pressure is configured to calculate the scalar product between the force measured by the force and torque sensor and the normal to an elementary facet determined as intercepting the axis passing through the point of application of pressure;

the geometric model of the surface of the object is described by a stereolithography file or by a CAD file;

it further comprises an actuator controlled by the processing unit in response to a characterisation of application of pressure on the surface of the object by the module for characterising the application of pressure.

The invention also relates to a method and a computer program product for detecting an application of pressure on a surface of an object.

BRIEF DESCRIPTION OF THE DRAWINGS

Other aspects, purposes, advantages and characteristics of the invention shall appear better when reading the following detailed description of preferred embodiments of the latter, given as a non-limiting example, and given in reference to the annexed drawings wherein.

DETAILED DESCRIPTION OF PARTICULAR EMBODIMENTS

The invention relates to a system for detecting an application of pressure on a surface of an object implementing an analysis of the forces and momentums exerted on the surface of the object and measured by the intermediary of at least one force and torque sensor integrated into a support of the object. The position of at least one sensor in relation to the object is known.

Figure 1:
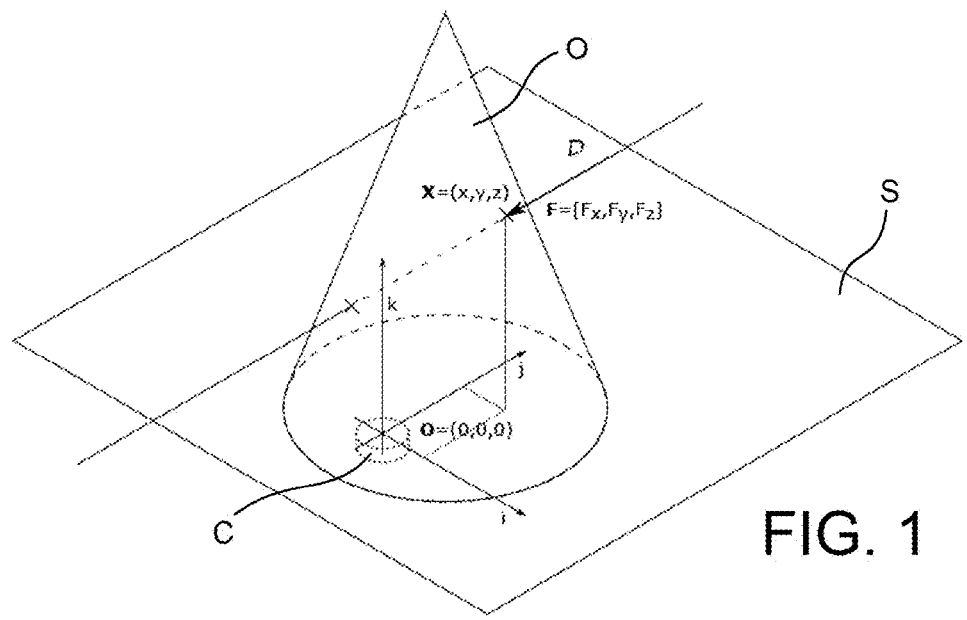
FIG. 1 is a diagram defining the problem of the detection of an application of pressure on a surface of an object by the analysis of the forces and momentums exerted.

FIG. 1 is a diagram of an object O with a tapered shape place on a support S provided with a force and torque sensor C at the point O take as the origin of a Cartesian coordinate system i, j, k. The application of pressure is exerted in one point X of the surface of the object 0.

As shown in the article mentioned hereinabove, based on the forces F=[Fx, Fy, Fz] and torques M=[Mx, My, Mz] measured by the sensor C, the point X of application of pressure on the surface of the object is located along an axis of the space D, referred to as skew axis, of which the parametric equation is given by $X = X_0 + Dp$, with p a scalar parameter, $X_0$ the origin of the axis and D the direction vector of the axis. More particularly:

$$D = \begin{bmatrix} Fx \\ Fy \\ Fz \end{bmatrix} \text{ and } X_0 = \frac{F + M}{|F|^2} = \frac{1}{Fx^2 + Fy^2 + Fz^2} \begin{bmatrix} FyMz - FzMy \\ FzMx - FxMz \\ FxMy - FyMx \end{bmatrix}$$

Figure 2:
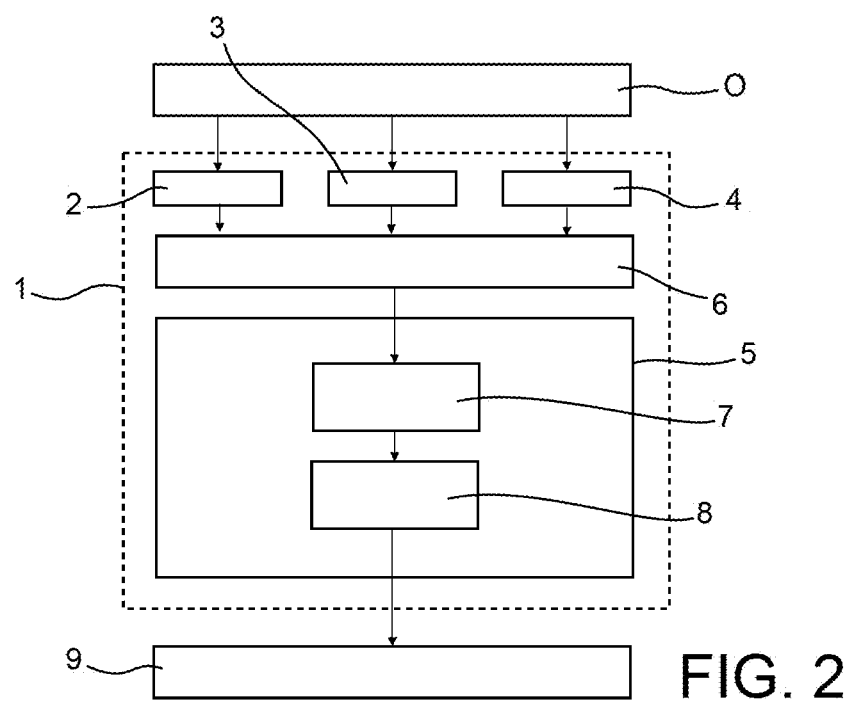
FIG. 2 is a diagram of a system of detection of an application of pressure on a surface of an object in accordance with the invention.

In reference to FIG. 2, the system 1 according to the invention comprises a support of the object O provided with at least one force and torque sensor 2-4, and a processing unit 5 configured to process the measurements of the at least one force and torque sensor 2-4. Each sensor 2-4 does not necessarily measure the forces and momentums according to the three axes but measures all of the forces exerted on it by the object. When the object has several supports, at least one force and torque sensor is provided on each of the supports.

The processing unit 5 can in particular be connected to the at least one sensor 2-4 by the intermediary of a device 6 for acquiring the signals produced by the at least one sensor 2-4 which digitises these signals before communicating them to the processing unit 5.

The processing unit 5 comprises a module 7 for characterising the application of pressure which locates the point of application of the pressure and determines the force exerted at this point of application.

The processing unit 5 can further comprise a module 8 making it possible to develop, using the characterisation of the application of pressure, a command intended for an actuator 9 making it possible to produce a sensory return (visual, audio, haptic or other) to the user or to carry out a physical action (for example the controlling of the orientation of a camera) or a virtual action (for example an interaction with a virtual object or digital content).

The module 7 for characterising the application of pressure is configured to calculate, using measurements of the at least one force and torque sensor, the coordinates of the skew axis passing through the point of application of pressure on the surface of the object.

In order to determine the intersection of the skew axis with the surface of the object, the invention proposes, not an analytical resolution which requires a mathematical description of the geometry of the object limited to simple shapes, but to have recourse to a ray tracing algorithm configured with the coordinates of the skew axis in order to identify the intersection point or points of the axis with the surface of the object and as such identify the point of application of pressure on the surface of the object. The ray tracing algorithm is of the type of those conventionally used in infography, in particular for the rendering of textures.

The module 7 for characterising the application of pressure is as such more particularly configured to determine, by means of a ray tracing calculation, if an elementary facet of a geometric model of the surface of the object representing said surface according to a meshing of elementary facets intercepts the axis passing through the point of application of pressure. This determination is carried out for all of the elementary facets of the model, and when a facet intercepts the skew axis, the facet is associated with a location of the point of application of pressure.

The facets can be triangles, in which case the ray tracing algorithm is advantageously a ray-triangle intersection algorithm. By way of example of such an algorithm, reference can be made to the following work: T. Möller and B. Trumbore, "Fast, Minimum Storage Ray/Triangle Intersection," in *ACM SIGGRAPH* 2005 *Courses*, New York, N.Y., USA, 2005.

The sum of the forces recorded by the sensors 2-4 also provides the three components (according to the axes x, y, and z) of the force exerted on the surface of the object. This force vector can be expressed in the coordinate system of the object and decomposed into a normal force and a force tangential to the facet intercepting the skew axis. As such, the module 7 for characterising the application of pressure can also be configured to determine the normal and tangential components of the application of pressure for the elementary facet associated with a location of the point of application of pressure. The normal component can in particular be used to provide a zoom control in a virtual environment. The tangential component is indicative of a friction coefficient on the surface of the object. Due to this friction, the tangential component of the force appears before the sliding of the finger on the surface. This tangential component as such marks the intention of the user and makes it possible to anticipate the movement of the user.

A facet associated with a location of the point of application of pressure is a facet that intercepts the skew axis. This interception is not necessarily unique, and in many cases there are at least two facets that correspond to the entry and exit points of the skew axis in the object. The force is however applied towards the object, in such a way that at the point of application of pressure, the scalar product between the force measured by the at least one force and torque sensor and the normal to the elementary facet is negative.

In a possible embodiment of the invention, this property is used to limit the search of the interception of the skew axis to only facets for which the aforementioned scalar product is negative. In this embodiment, the module 7 for characterising the application of pressure is configured to calculate, for each elementary facet, the scalar product between the force measured by the force and torque sensor and the normal to the elementary facet. The calculation of the ray tracing is then carried out to verify if the elementary facet intercepts the skew axis only if the scalar product calculated is negative, which makes it possible to reduce the data processing.

In another embodiment, it is after the ray tracing that this property of the scalar product is used. The module 7 for characterising the application of pressure is then configured to calculate the scalar product between the force measured by the force and torque sensor and the normal to an elementary facet determined as intercepting the skew axis. It is as such possible to disambiguate the entry point from the exit point of the skew axis in the object, and retain for point of application of pressure the elementary facet of the negative scalar product.

The geometric model used in the framework of the invention does not necessarily reproduce all of the details of the object but represents the surfaces that are able to be touched. For example, a hollow object intended to be touched only on the exterior can be modelled as solid.

This model can be obtained in many ways. For an object created via 3D printing, the stereolithography file describing the surface of the object to the printer can be used directly. Such a file is furthermore advantageous in each one of the facets therein is in particular described by the normal to its surface, which can therefore easily be used for the calculation of the scalar product mentioned hereinabove. A CAD computer aided design file of a manufactured object can also be used.

When there is no pre-existing file of this type, the model can be constructed using a 3D scanner or any image-taking means that make it possible to reconstruct in three dimensions the surface of the object to be rendered tactile.

The invention is not limited to the system such as described hereinabove but also extends to the method implemented by such a system, and in particular to a method of detecting an application of pressure on a surface of an object, comprising a step of calculating, using measurements of at least one force and torque sensor provided on a support of the object, coordinates of an axis of the space passing through a point of application of pressure on the surface of the object, characterised in that it further comprises a step consisting in determining, by means of a ray tracing calculation, if an elementary facet of a geometric model of the surface of the object representing said surface according to a meshing of elementary facets intercepts the axis passing through the point of application of pressure. The invention also relates to a computer program product comprising program code instructions making it possible to carry out the steps of the method when said program is executed on a computer.

FIGS. 3a-3f show different surfaces that can be rendered tactile by the implementation of the invention, and this even after the design and the manufacture of an object and without affecting the design thereof.

Figure 3A:
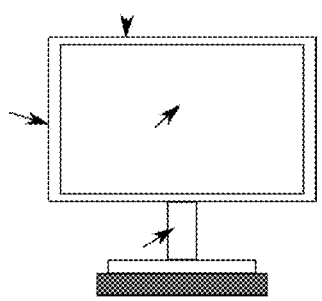
FIGS. 3a-3f are diagrams showing different surfaces that can be rendered tactile by the implementation of the invention.

In FIG. 3a, the force and torque sensor or sensors are placed in the base of a screen to render it tactile, as well as its contour or its base. In addition to making possible a tactile interaction with the content displayed on the screen, the invention makes it possible to create virtual buttons on the edges of the screen to as such control the turning on of the screen, the volume of the sound, the brightness or any other function.

Figure 3B:
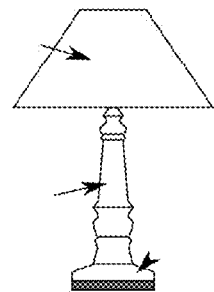

Another application is shown in FIG. 3b which makes it possible to render tactile furniture, such as the base or the lampshade of a lamp. The invention makes it possible for example to control the intensity of the lighting by sliding the finger on the base of the lamp, or to modify the colour of the light by running around the outer edge of the lampshade.

Figure 3C:
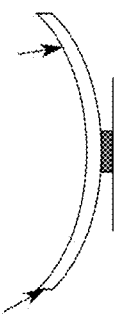

In FIG. 3c, the sensor or sensors are placed on a vertical support. A curved screen hung on the wall by the intermediary of such a support can as such be rendered tactile.

Figure 3D:
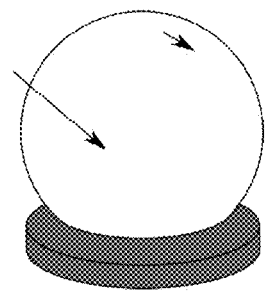

In FIG. 3d, a spherical surface is used to control the orientation of a camera or to navigate in a virtual environment, such as mapping software. In this latter case, the spherical surface acts as a map and the position touched then naturally indicates the latitude and longitude of the location to be reached or the direction to point to. The simultaneous access to the force exerted by the touch also makes it possible to zoom in naturally on a point.

Figure 3E:
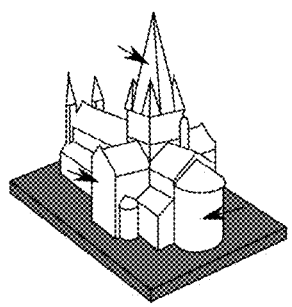

Such as shown in FIG. 3e, a sculpture model or a replica can be rendered tactile simply by placing it on an instrumented base. It is then possible for example to access specific multimedia content by touching a zone of this model.

Figure 3F:

Finally, as shown in FIG. 3f, a dashboard or the control panel of a machine can be rendered tactile, regardless of its shape and without constraint on the materials or design thereof.

The fields of application of the invention are as such particularly varied. The automobile, aeronautical industries for example can use it in order to create commands and functionalise the surfaces of a passenger compartment or of a cockpit. The entertainment and culture industry can use it to allow for interaction with digital content via tangible objects. The furniture industry can thanks to the invention propose domotics applications.

The invention claimed is:
1. A System for detecting an application of pressure on a surface of an object, comprising:
   a support of the object provided with at least one force and torque sensor, and
   a processing unit which comprises a module configured to calculate, using measurements of the at least one force and torque sensor, the coordinates of an axis of the space passing through a point of application of pressure on the surface of the object, wherein said module is further configured to determine, by means of a ray tracing calculation, if an elementary facet of a geometric model of the surface of the object representing said surface according to a meshing of elementary facets intercepts said axis.

2. The system according to claim 1, wherein said module is further configured, upon determining that an elementary facet intercepts said axis, to associate said elementary facet with a location of the point of application of pressure.

3. The system according to claim 2, wherein said module is further configured to determine normal and tangential components of the application of pressure for the elementary facet associated with a location of the point of application of pressure.

4. The system according to claim 1, wherein said module is further configured to calculate a scalar product between the measurements of the at least one force and torque sensor and the normal to each elementary facet of the geometric model, with the ray tracing calculation being performed to verify if an elementary facet intercepts said axis only if the scalar product calculated for said elementary facet is negative.

5. The system according to claim 1, wherein said module is configured to calculate a scalar product between the measurements of the at least one force and torque sensor and the normal to an elementary facet determined as intercepting said axis.

6. The system according to claim 1, wherein the geometric model is described by a stereolithography file or by a CAD file.

7. The system according to claim 1, further comprising an actuator controlled by the processing unit in response to a characterisation of application of pressure on the surface of the object by said module.

8. A method for detecting an application of pressure on a surface of an object, comprising:
- a step of calculating, using measurements of at least one force and torque sensor provided on a support of the object, coordinates of an axis of the space passing through a point of application of pressure on the surface of the object, and a step of determining, by means of a ray tracing calculation, if an elementary facet of a geometric model of the surface of the object representing said surface according to a meshing of elementary facets intercepts the said axis.

9. A computer program product comprising program code instructions that perform the steps of the method according to claim 8 when said program is executed on a computer.

* * * * *

UNITED STATES PATENT AND TRADEMARK OFFICE
CERTIFICATE OF CORRECTION

PATENT NO. : 10,585,520 B2
APPLICATION NO. : 15/770879
DATED : March 10, 2020
INVENTOR(S) : Charles Hudin and Steven Strachan Page 1 of 1

It is certified that error appears in the above-identified patent and that said Letters Patent is hereby corrected as shown below:

In the Specification

Column 3, Line 64:

" $D = \begin{bmatrix} Fx \\ Fy \\ Fz \end{bmatrix}$ and $X_0 = \frac{F+M}{|F|^2} = \frac{1}{Fx^2+Fy^2+Fz^2} \begin{bmatrix} FyMz - FzMy \\ FzMx - FxMz \\ FxMy - FyMx \end{bmatrix}$ "

Should be:

-- $D = \begin{bmatrix} Fx \\ Fy \\ Fz \end{bmatrix}$ and $X_0 = \frac{F*M}{|F|^2} = \frac{1}{Fx^2+Fy^2+Fz^2} \begin{bmatrix} FyMz - FzMy \\ FzMx - FxMz \\ FxMy - FyMx \end{bmatrix}$ --

Signed and Sealed this
Twenty-fifth Day of May, 2021

Drew Hirshfeld
*Performing the Functions and Duties of the
Under Secretary of Commerce for Intellectual Property and
Director of the United States Patent and Trademark Office*